US010750686B2

(12) United States Patent
Zhou

(10) Patent No.: US 10,750,686 B2
(45) Date of Patent: Aug. 25, 2020

(54) ATMOSPHERICALLY WATERED PLANTER

(71) Applicant: Declan Evan Zhou, Aliso Viejo, CA (US)

(72) Inventor: Declan Evan Zhou, Aliso Viejo, CA (US)

( * ) Notice: Subject to any disclaimer, the term of this patent is extended or adjusted under 35 U.S.C. 154(b) by 60 days.

(21) Appl. No.: 16/219,026

(22) Filed: Dec. 13, 2018

(65) Prior Publication Data

US 2020/0187437 A1 Jun. 18, 2020

(51) Int. Cl.
*A01G 27/00* (2006.01)
*A01G 9/02* (2018.01)
*F25B 21/02* (2006.01)
*E03B 3/28* (2006.01)
*A01G 25/00* (2006.01)

(52) U.S. Cl.
CPC ............. *A01G 27/008* (2013.01); *A01G 9/02* (2013.01); *A01G 25/00* (2013.01); *E03B 3/28* (2013.01); *F25B 21/02* (2013.01)

(58) Field of Classification Search
CPC .......... A01G 29/00; A01G 9/24; A01G 27/00; A01K 1/011; A01K 1/0114; A01K 5/0107; A01K 5/0225; A01M 17/00; F25B 21/02; F25B 21/04; Y02B 30/62; Y02B 30/64; Y02B 10/24; F24F 5/0042; F24F 2221/54; F24F 2110/20
See application file for complete search history.

(56) References Cited

U.S. PATENT DOCUMENTS

| 4,315,599 A | * | 2/1982 | Biancardi | A01G 25/00 239/10 |
| 5,319,937 A | * | 6/1994 | Fritsch | F25B 21/04 292/DIG. 38 |
| 5,634,342 A | | 6/1997 | Peeters et al. | |
| 6,401,389 B1 | * | 6/2002 | Mount | A01G 27/02 47/65.5 |
| 2007/0176306 A1 | * | 8/2007 | Huang | F24F 6/00 261/72.1 |
| 2014/0318012 A1 | * | 10/2014 | Fujiyama | F24F 11/0001 47/62 R |

FOREIGN PATENT DOCUMENTS

| ES | 2257162 A1 * 7/2006 |
| KR | 101818678 B1 * 1/2018 |

OTHER PUBLICATIONS

Dehumidifier Planter Pyramid by TroyTurner dated Oct. 15, 2012, 3 pages.

\* cited by examiner

*Primary Examiner* — Timothy D Collins
*Assistant Examiner* — Brittany A Lowery
(74) *Attorney, Agent, or Firm* — Lapple Ubell IP Law, LLP; Franklin D. Ubell

(57) ABSTRACT

A planter wherein a water tray is positioned in the bottom of a front compartment of a housing and has a bottom surface angled downwardly to the horizontal. A water generating unit comprising a Peltier device is also mounted in the front compartment and draws air through a plurality of vertically disposed cold sink fins such that moisture in the air condenses on the fins, flows downwardly by gravity into the water tray, and then by gravity through the water tray and into the bottom of a plant container portion of the housing.

19 Claims, 12 Drawing Sheets

ATMOSPHERICALLY WATERED PLANTER

BACKGROUND

Field

The subject disclosure relates to an atmospherically watered planter and more particularly to such a planter wherein water extracted from the atmosphere is fed by gravity into a plant containing portion of the planter.

Description of Related Art

Generally, all household plants require periodic watering to sustain plant growth. Conventionally, such watering is typically provided manually by handheld containers such as watering cans.

SUMMARY

According to an illustrative embodiment, an atmospherically watered planter is provided comprising a housing having a front compartment separated by a wall from a rear compartment, the front compartment having an open top and the rear compartment comprising a container configured to receive a plant. The front compartment has a perforated front surface and is closed by a cover having a plurality of apertures formed therein. A water tray is positioned in the front compartment of the housing and has a bottom surface angled downwardly to the horizontal to communicate with an opening in a lower end of the wall.

The front compartment of the planter further contains a water generating device comprising a Peltier device, a fan and a plurality of vertically disposed fins. The water generating device is configured to draw air through the perforated area of the housing through the vertically disposed fins and to expel the air out through the apertures of the cover such that atmospheric water condenses on the vertically disposed fins, flows downwardly by gravity into the water tray, then flows by gravity feed through the water tray to the opening in the lower end of the housing wall and then into the container. In an illustrative embodiment, the vertically disposed fins are cold sink fins facing the perforated air intake area of the housing.

DETAILED DESCRIPTION OF ILLUSTRATIVE EMBODIMENTS

Figure 1:
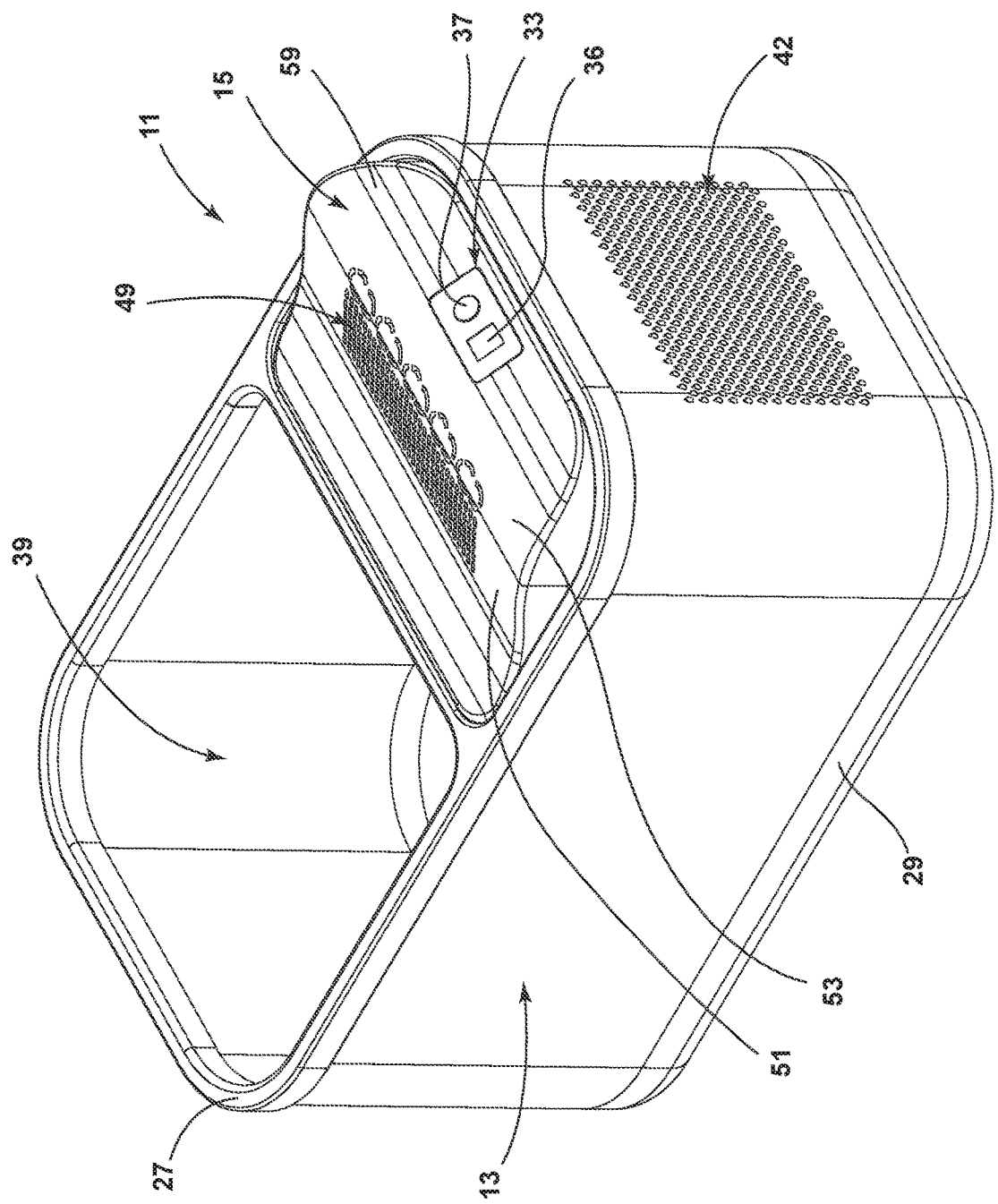
FIG. 1 is a front perspective view of an atmospheric watered planter according to an illustrative embodiment.
Figure 2:
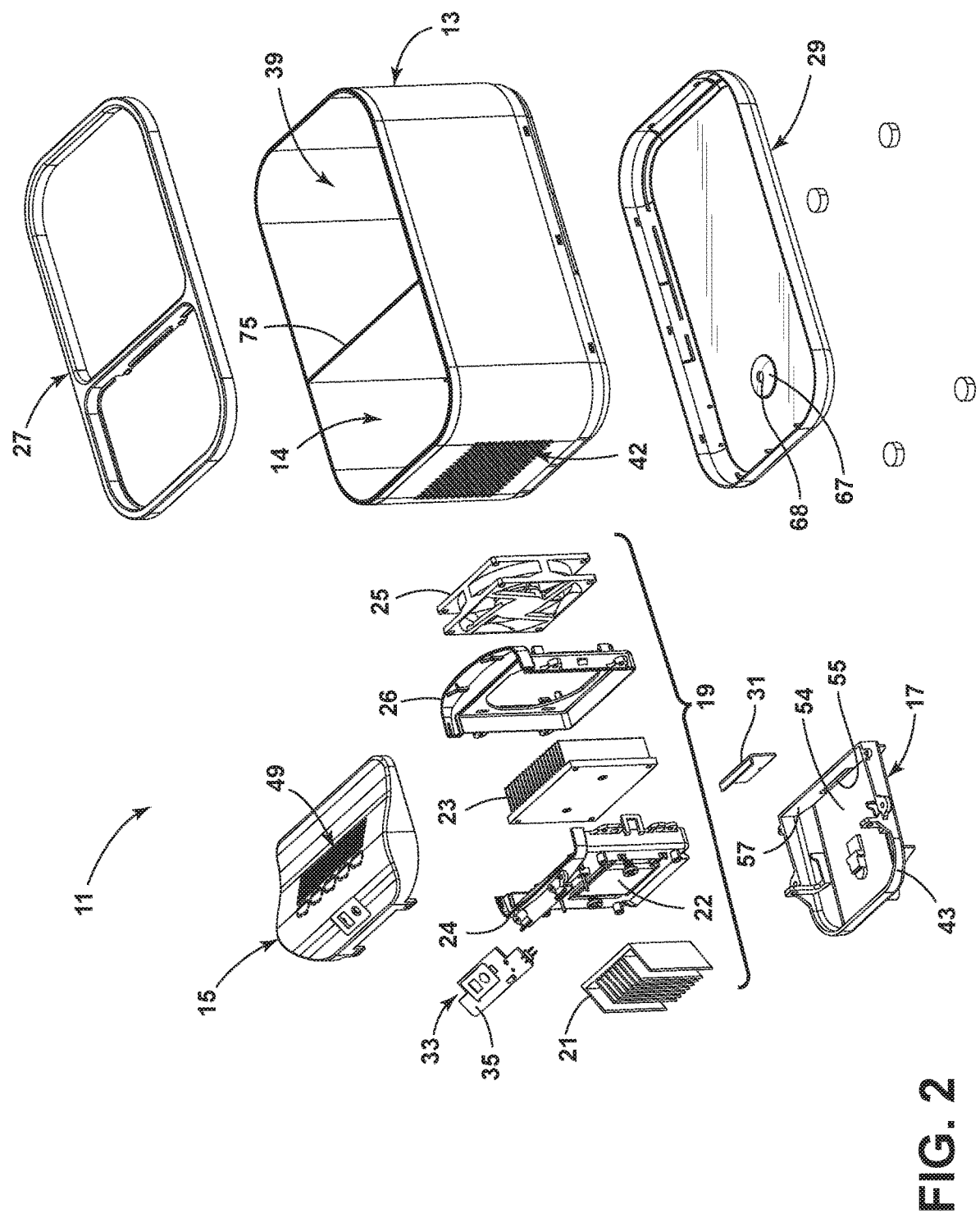
FIG. 2 is an exploded perspective view of the planter of FIG. 1.

FIGS. 1 and 2 depict an illustrative embodiment of an atmospherically watered planter 11. The planter 11 includes a housing 13, a cover plate 15, a water tray 17, and a water generating unit 19. The planter 11 further includes an upper rim component 27, a bottom piece 29, a cover piece 31, and a display unit 33, which includes a circuit board 35, a display 36, and control button 37.

In the illustrative embodiment, the water generating unit 19 includes a cold sink 21, a heat sink 23, frame components 24, 26, a fan 25, and a Peltier unit or device 22. In one embodiment, the cold sink 21 and heat sink 23 may be commercially available aluminum heat sink units, and the Peltier device 22 may be a commercially available square unit with input and output electrical leads. A Peltier device typically has two sides, and when a DC electric current flows through the device, it brings heat from one side to the other, so that one side gets cooler while the other gets hotter. The "hot" side is attached to a heat sink so that it remains at ambient temperature, while the cool side goes below room temperature. In some applications, multiple coolers can be cascaded together for lower temperature.

According to one construction of a Peltier device, two unique semiconductors, one n-type and one p-type, are used to provide different electron densities. The semiconductors are placed thermally in parallel to each other and electrically in series and then joined with a thermally conducting plate on each side. When a voltage is applied to the free ends of the two semiconductors there is a flow of DC current across the junction of the semiconductors causing a temperature difference. The side with the cooling plate absorbs heat which is then moved to the other side of the device where the heat sink is located.

Figure 3:
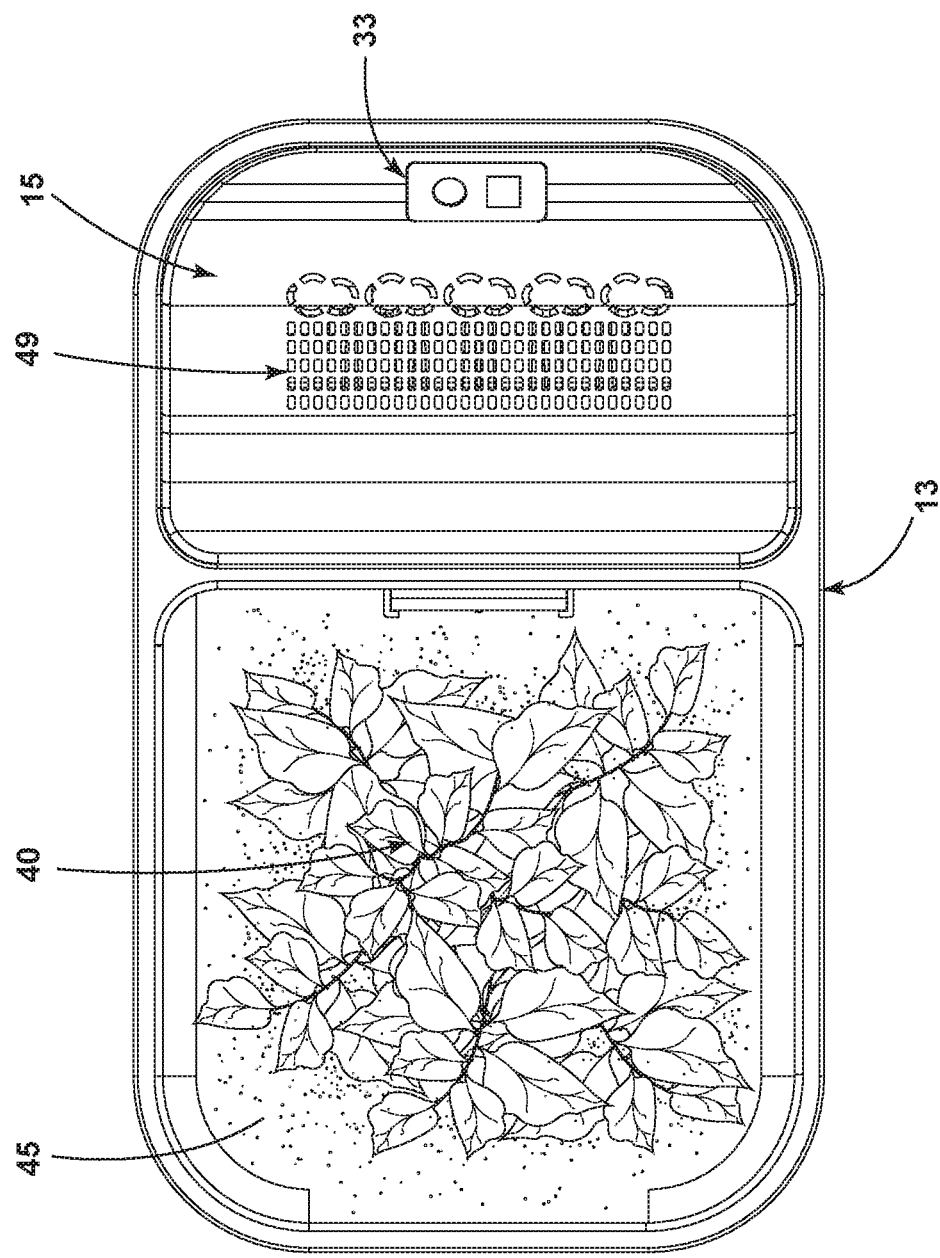
FIG. 3 is a top view of the planter of FIG. 1.
Figure 4:
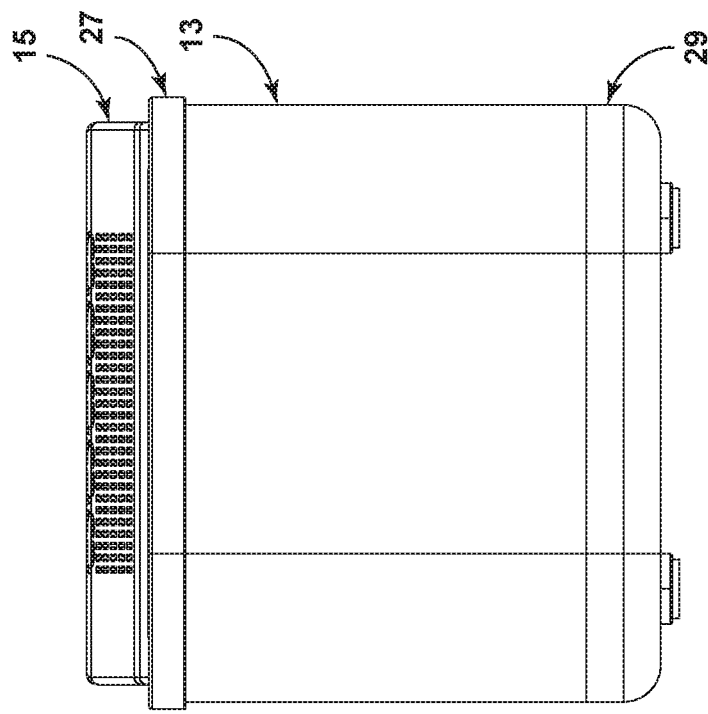
FIG. 4 is a front end view of the planter of FIG. 1.
Figure 5:
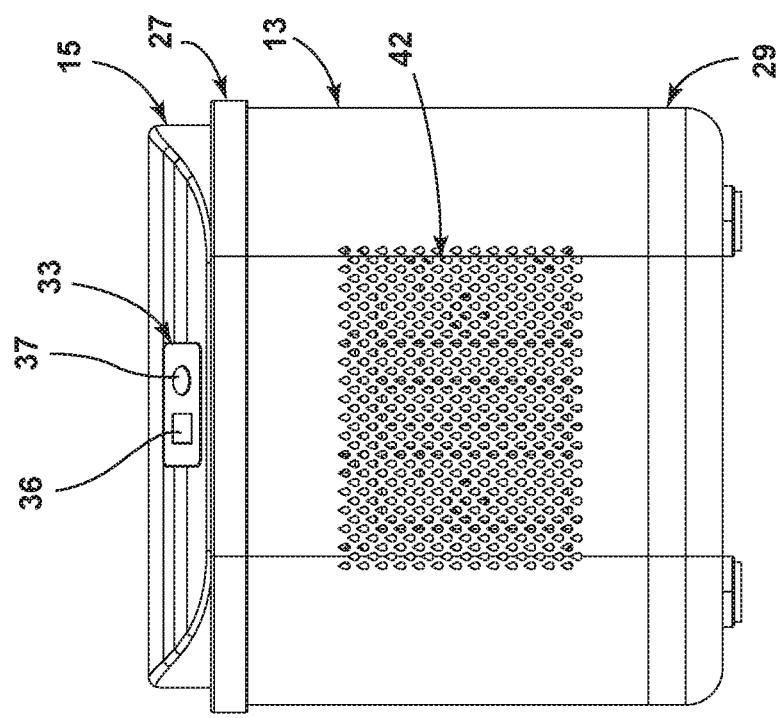
FIG. 5 is a rear end view of the planter of FIG. 1.
Figure 6:
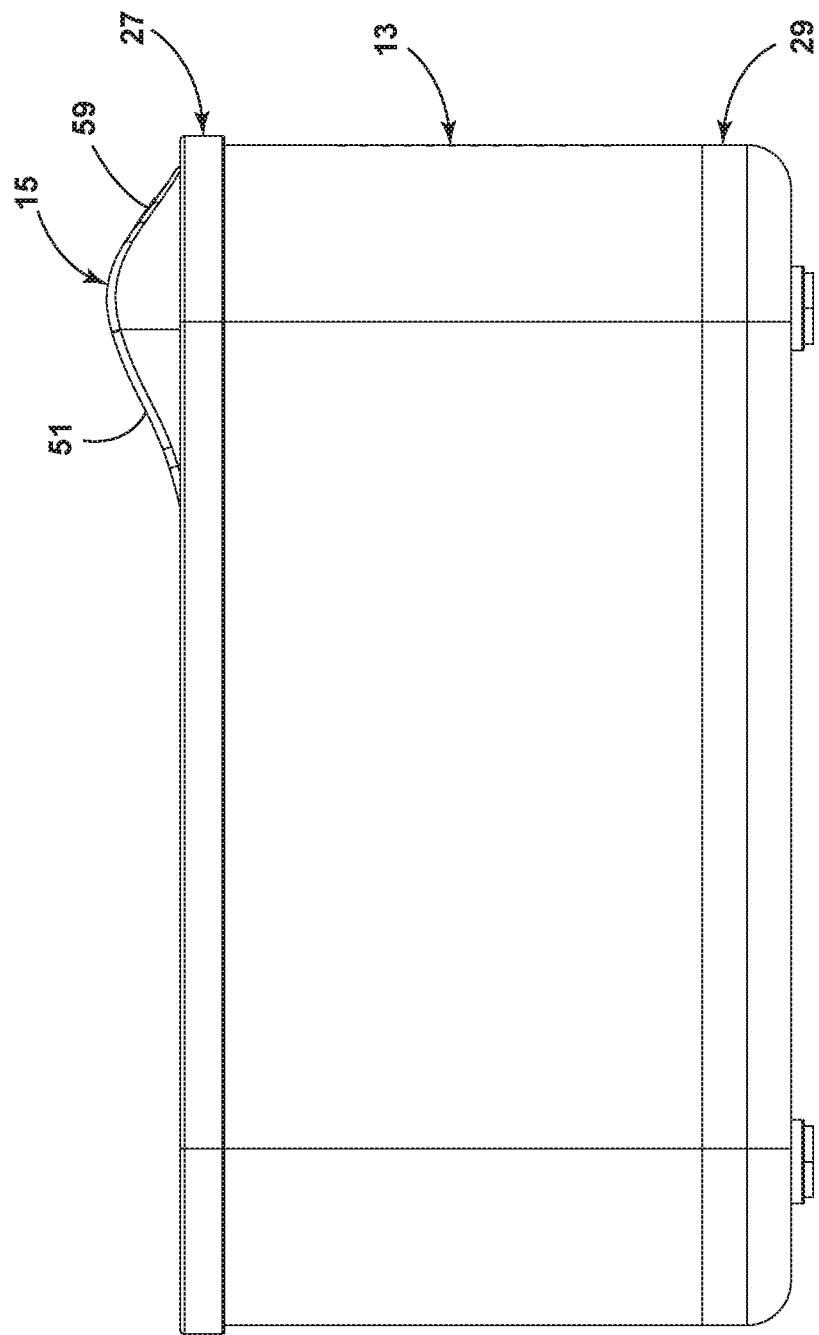
FIG. 6 is a side view of the planter of FIG. 1.
Figure 7:
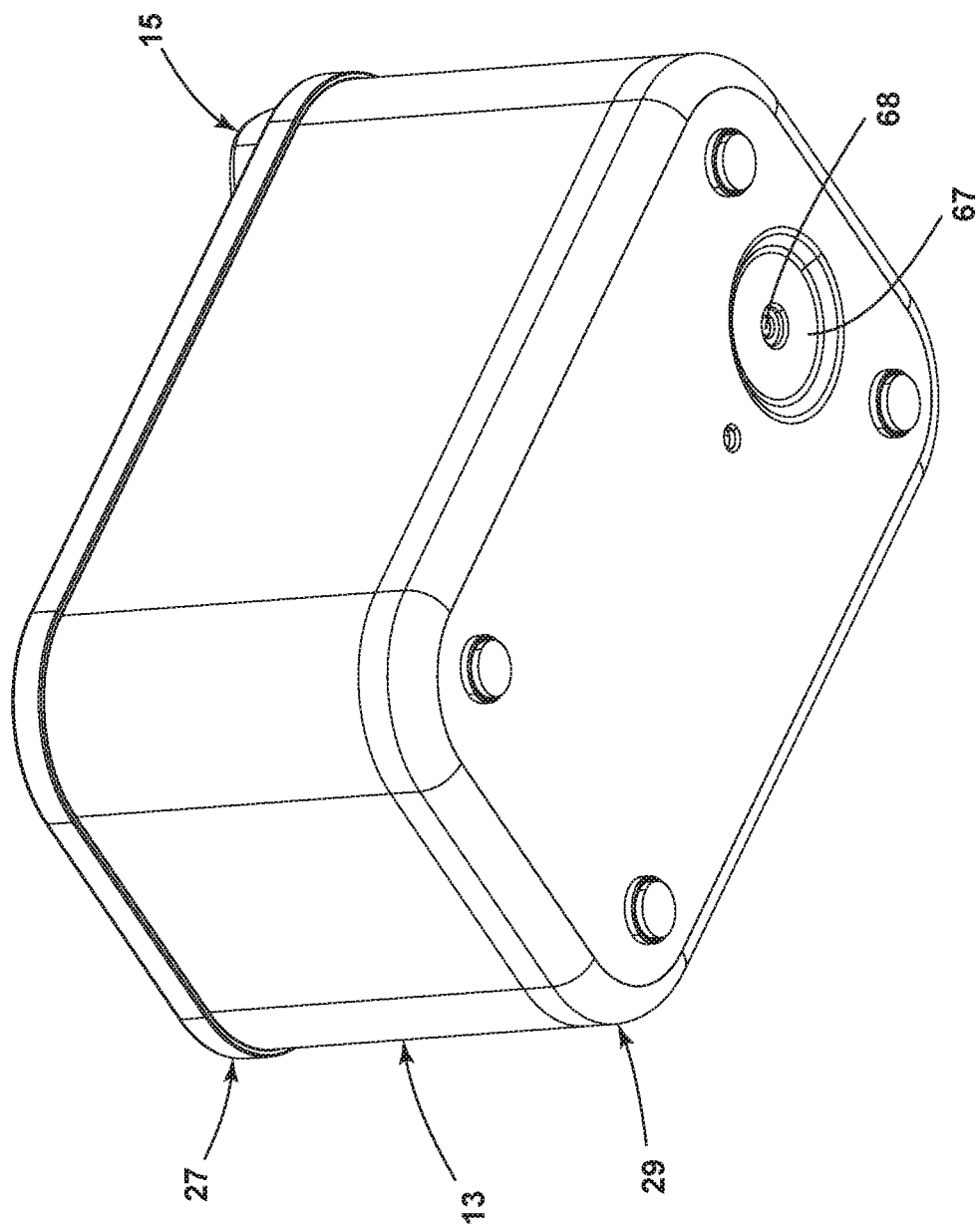
FIG. 7 is a bottom perspective view of the planter of FIG. 1.
Figure 8:
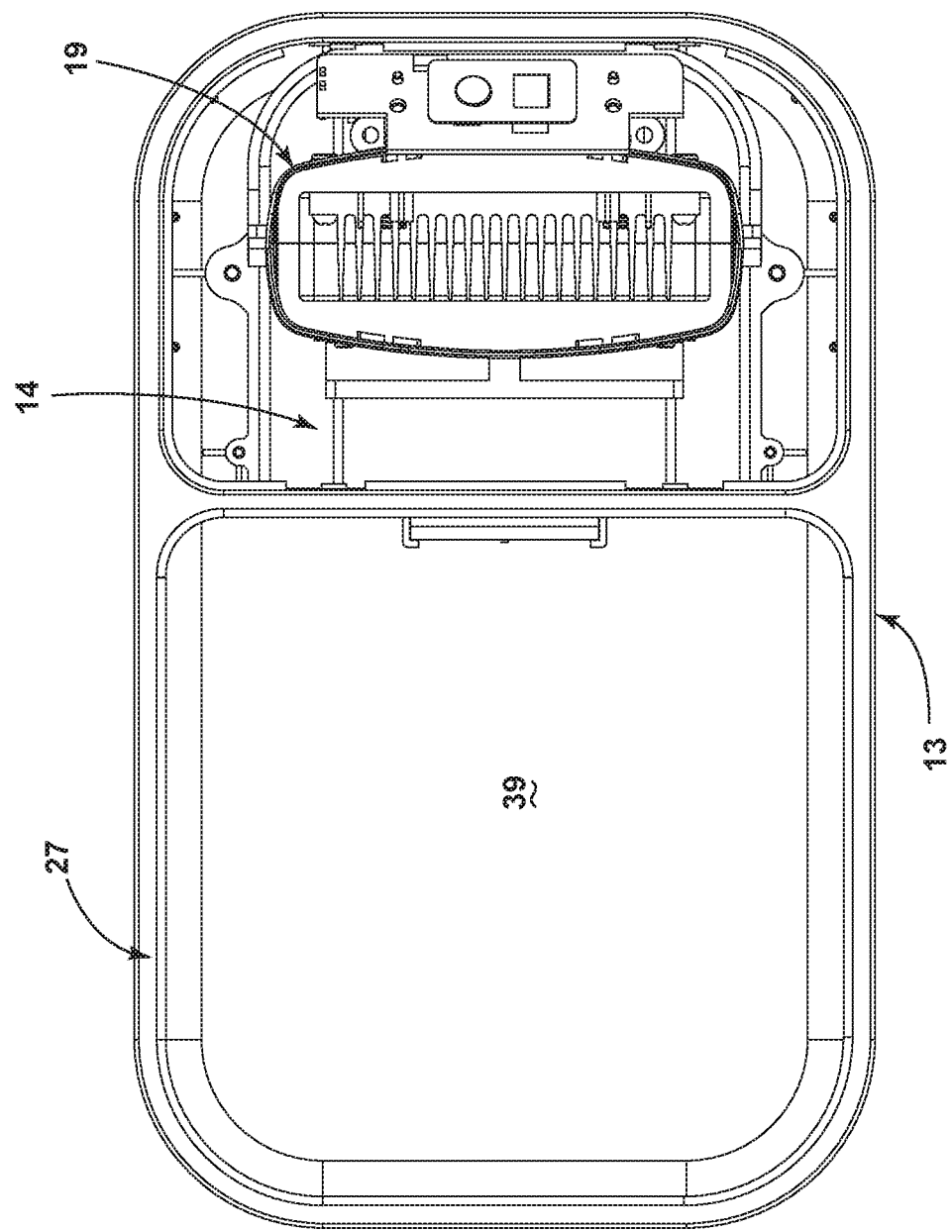
FIG. 8 is a top view of the planter of FIG. 1 with a cover component removed.
Figure 9:
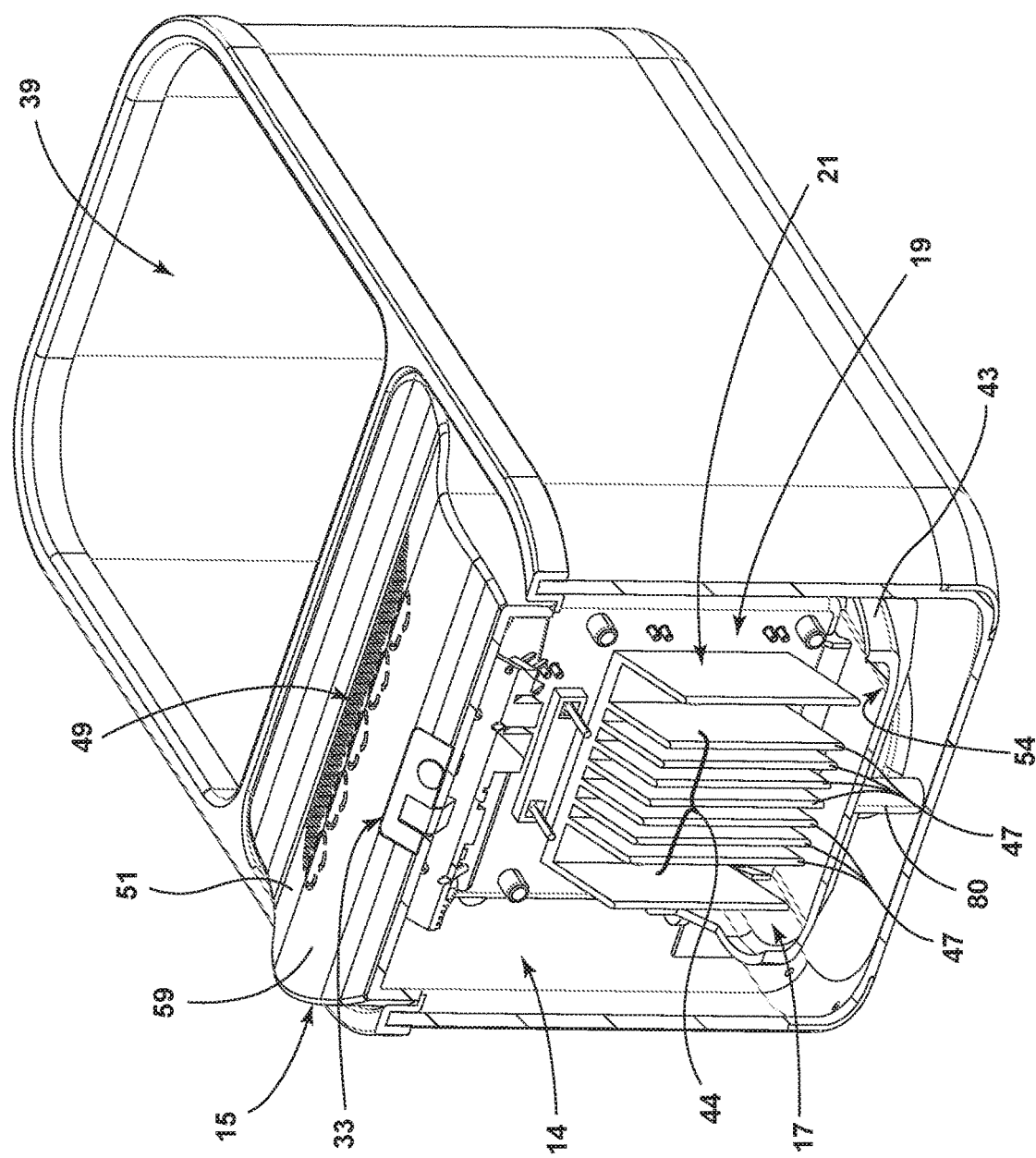
FIG. 9 is a front sectional perspective view of the planter of FIG. 1.

As may be seen in FIGS. 5-11, the water generating unit 19 is mounted in a front compartment 14 of the housing 13, while a rear portion of the housing 13 provides an open faced container 39 for one or more plants, e.g. 40, FIG. 3. The water generating unit 19 includes vertical fins 44 formed as part of the cold sink 21 and which are positioned behind a perforated area 42 formed in the front of the housing 13. In one embodiment, the perforated area 42 may be rectangular, but may be other shapes in other embodiments. In the illustrative embodiment, a lower end 47 of each vertical fin 44 is positioned within the vertical perimeter 43 of the water tray 17.

Figure 12:
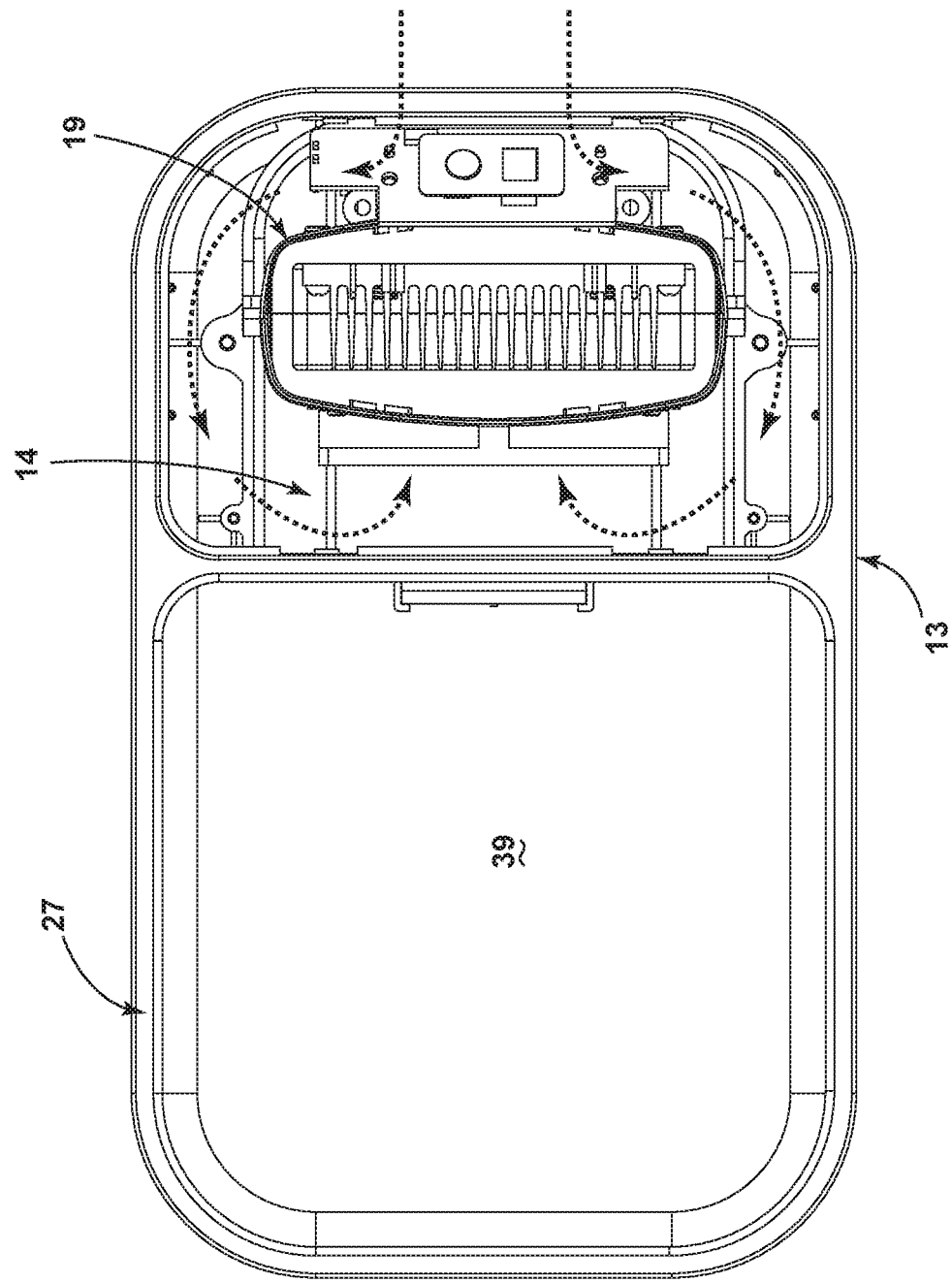
FIG. 12 is a top view illustrating air flow in an illustrative embodiment.
Figure 13:
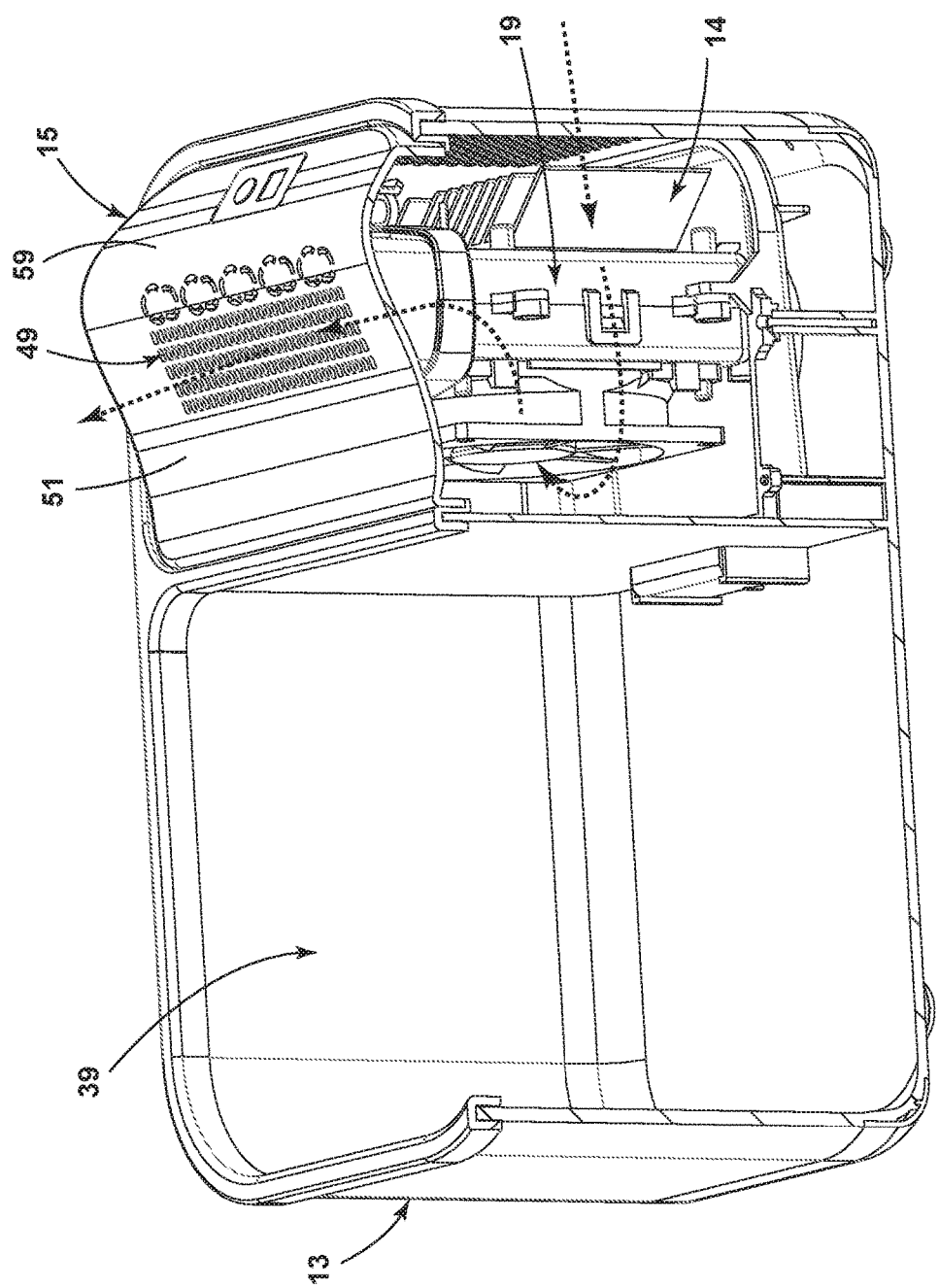
FIG. 13 is a side sectional view illustrating air flow in an illustrative embodiment.

In operation, as shown by the dashed arrows in FIGS. 12 and 13, moisture laden atmospheric air is drawn in by operation of the fan 25 and passes across the cold sink fins 44, then through the fan 25, then past the heat sink 23, then through a discharge port 48 of the water generating unit 19, and out through apertures 49 formed on a back side 51 of the curved surface 53 (FIG. 1) of the cover plate 15. Atmospheric moisture condenses on the outward facing cold sink fins 44 and then flows downwardly via gravitational force into the water tray 17. The bottom surface 54 of the water tray 17 is disposed at an angle to the horizontal such that the water collected from the vertical fins 44 flows by gravity feed downwardly and through a rectangular slit or opening 55 in a wall 57 of the water tray 17 and into the plant container 39. Once in the bottom of the container 39, the water moves upwardly on its own into the soil 45 (FIG. 3).

The display unit 33 is mounted in the downwardly curved front surface 59 of the cover plate 15 and contains a numeric display 36 and a control button 37. The control button 37 and display 36 are used to set the time interval during which the water generating unit 19 operates to extract moisture from the air for watering purposes. For this purpose, the control button 37 supplies a suitable electrical input signal to a control unit mounted on the circuit board 35 located behind the display 36. In response to the control button input, the control unit controls the amount of time that electrical power is supplied to the water generation unit 19 to thereby control its period of operation. For example, it may be desirable to vary the time of operation of the water generating unit 19 as the humidity in the surrounding air varies, dryer air typically requiring a longer period of operation.

In an illustrative embodiment, the control unit may comprise a microprocessor, while in other embodiments it may comprise hard wired control logic. In one embodiment, the control button 37 selects an integer number of hours during which the water generating unit 19 operates, but could be configured to select other time periods of operation, particular days of operation etc.

Figure 10:
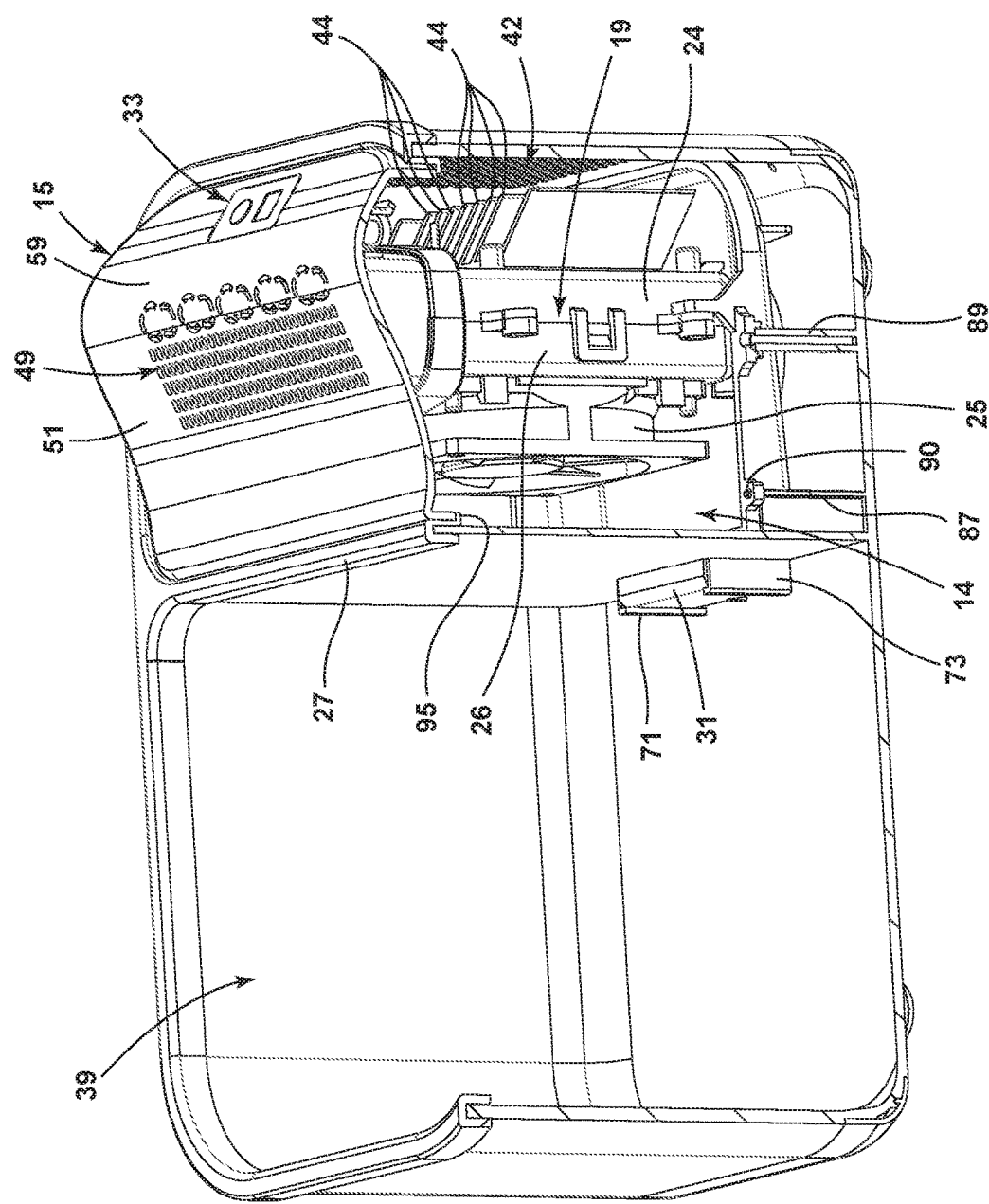
FIG. 10 is a side sectional perspective view of the planter of FIG. 1.
Figure 11:
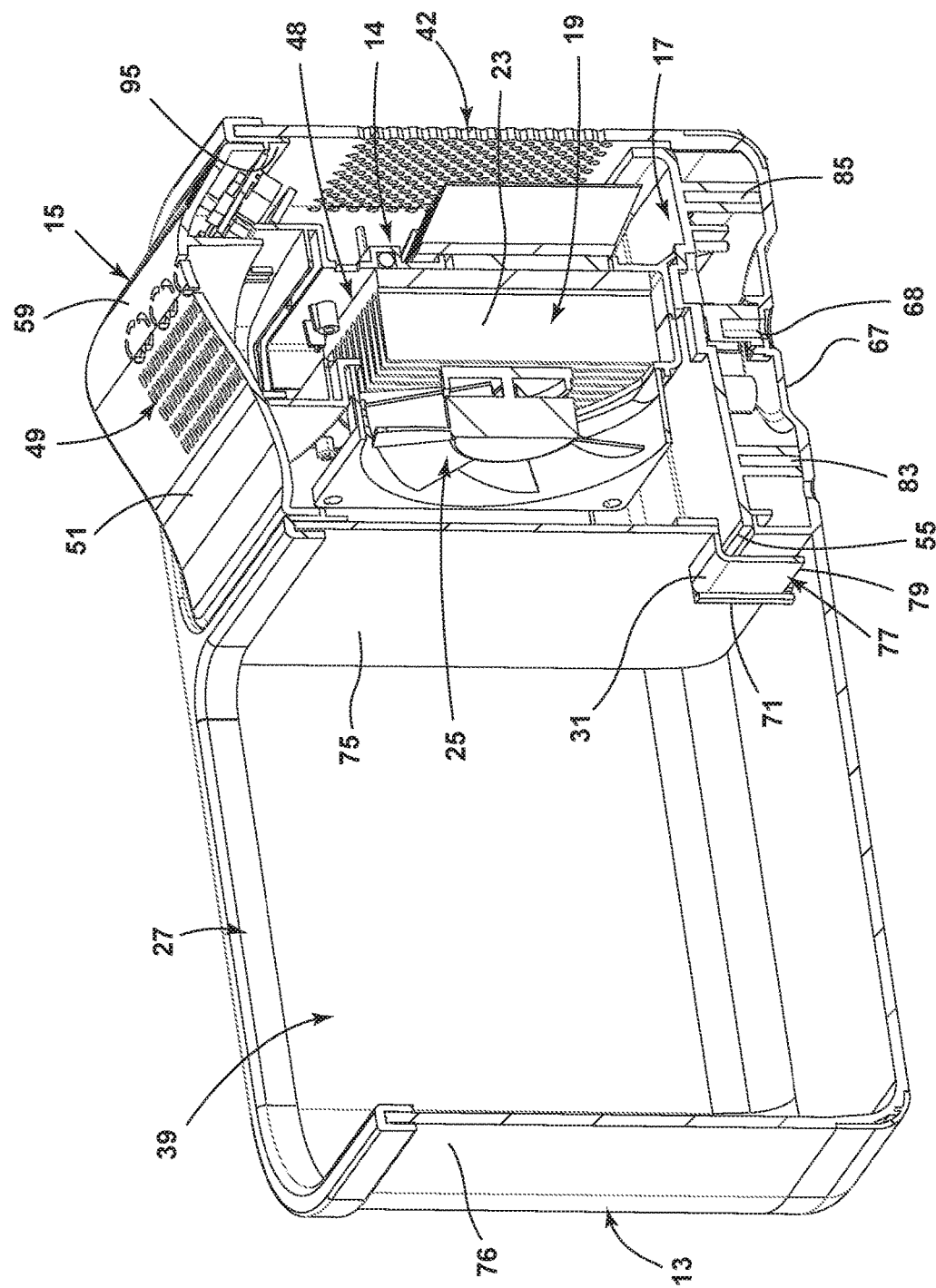
FIG. 11 is a second side sectional perspective view of the planter of FIG. 1.

As shown in FIGS. 10 and 11, the cover piece 31 slides into vertical guides 71, 73 located on a back surface of a vertical wall 75 of the housing 13. The cover piece 31 is shaped to shield the water outlet 55 of the water tray 13 from dirt and other contaminants, while providing a slight gap 77 at its bottom edge 79 to allow water to flow into the container 39 from the water tray 17. A power port 68 is formed in a depression 67 in the bottom 29 of the housing 13 beneath the water tray 17 to allow for a power connection to the circuit board 35, the Peltier device 22 and the fan 25 from an external power supply, which may be, for example, a transformer, a battery or other source of power.

From FIGS. 9-13, it may be seen that suitable support members 80, 83, 85, 87, 89 are molded into or otherwise formed on the housing 13 for purposes of mounting, positioning, and supporting the water generating unit 19 and water tray 17. FIG. 10 illustrates a support 87, which has a pin 90 that fits through a slot or hole in the water tray 17 and another support 89, which has a bore 91, which may receive a screw. In one embodiment, the water tray 17 may snap or plug into the housing 13, and the water generating unit 19 and fan 25 may be screwed to the water tray 17. Various alternative support and fastening structures may be provided according to alternative embodiments.

As may be seen in FIGS. 10 and 11, the upper rim 27 includes a u-shaped channel which snaps or otherwise fits onto the top edges of the vertical walls, e.g., 75, 76 of the housing 13. The cover plate 15 snaps or otherwise fits into the top of the front compartment 14 of the housing 13 and rests on horizontal lips 95 extending from the top rim 27. In an illustrative embodiment, the housing 13, upper rim 27, bottom 29, water tray 17, cover plate 15 and cover piece 31 may be molded plastic components, but may fabricated according to other methods in other embodiments.

From the foregoing, those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:

1. An atmospherically watered planter comprising:
   a housing having a front compartment, a rear compartment, and a wall separating the front compartment from the rear compartment, the front compartment having an open top and the rear compartment comprising a container configured to receive a plant, the wall having an opening in a lower end thereof, the housing further having a front surface comprising a perforated area;
   a water tray positioned in the front compartment of the housing and having a bottom surface configured to communicate with the opening in the lower end of the wall;
   a cover closing the open top of the front compartment and having a plurality of apertures formed therein through which air can be expelled out of said front compartment and into the atmosphere surrounding the planter; and
   a water generating device located in said front compartment and comprising a Peltier device, a fan, and a plurality of cold sink fins, the water generating device being configured to draw air through the perforated area of the housing so as to contact the cold sink fins and to expel the air out of the front compartment through the plurality of apertures in said cover and into the atmosphere surrounding the planter, such that water condenses on the cold sink fins and flows by gravity into said water tray, the water tray being further configured such that the water thereafter flows by gravity feed through the water tray and then through the opening in the lower end of said wall and into said container configured to receive a plant.

2. The planter of claim 1 wherein the plurality of cold sink fins face outwardly towards said perforated area.

3. The planter of claim 1 wherein the bottom surface of the water tray is angled downwardly to the horizontal in order to achieve the gravity feed of water through the tray.

4. The planter of claim 1 wherein the plurality of cold sink fins are vertically disposed and have lower ends which reside within a vertical perimeter of said water tray.

5. The planter of claim 4 wherein the bottom surface of the water tray is angled downwardly to the horizontal in order to achieve the gravity feed of water through the tray.

6. The planter of claim 1 further comprising a vertical guide positioned in first and second slots on a back surface of said wall so as to shield the opening in said wall from foreign matter present in said rear compartment.

7. The planter of claim 1 wherein the water generating device comprises first and second heat sinks located on respective opposite sides of the Peltier device and wherein one of said heat sinks functions as said cold sink.

8. An atmospherically watered planter comprising:
   a housing comprising a front compartment, the front compartment having a base, an open top, and a front surface comprising a perforated area;
   the housing further having a rear compartment comprising an open container configured to receive a plant and a wall which forms a watertight seal between the front and rear compartments with the exception of an opening in a lower end thereof which enables water transmission between the front and rear compartments;
   a cover configured to close the open top of the front compartment while leaving the rear compartment open to receive a plant, the cover having a plurality of apertures formed therein through which air can be expelled from the front compartment into the atmosphere surrounding the planter;
   wherein the front compartment of the housing contains a water generating device located above a water tray, the water tray being positioned above and spaced apart from the base of the front compartment;

wherein the water tray has a bottom surface angled downwardly and otherwise configured so as to achieve gravity feed through the tray of all water received by it;

wherein the water generating device comprises a Peltier device, a fan, and a plurality of cold sink fins, the water generating device being configured to draw air through the perforated area of the housing so as to contact the cold sink fins and to expel the air out through the plurality of apertures formed in said cover and into the atmosphere surrounding the planter, such that water condenses on the cold sink fins and flows downwardly by gravity into said water tray, the downward angle of the bottom surface of the water tray thereafter causing the water to flow by gravity feed through the water tray and then through the opening in the lower end of said wall and into said container configured to receive a plant.

9. The planter of claim 8 wherein the plurality of cold sink fins face outwardly towards said perforated area.

10. The planter of claim 9 wherein the plurality of cold sink fins are vertically disposed and have lower ends which reside within a vertical perimeter of said water tray.

11. The planter of claim 10 further comprising a vertical guide positioned in first and second slots on a back surface of said wall so as to shield the opening in said wall from foreign matter present in said rear compartment.

12. The planter of claim 8 wherein the water generating device comprises first and second heat sinks located on respective opposite sides of the Peltier device and wherein one of said heat sinks functions as said cold sink.

13. An atmospherically watered planter comprising:
a housing having a front compartment and a rear compartment and a wall separating the front compartment from the rear compartment, the front compartment having an open top and the rear compartment comprising a container configured to receive a plant, the wall having an opening in a lower end thereof, the housing further having a front surface comprising a perforated area;
a water tray positioned in the front compartment of the housing and positioned by a plurality of legs above a bottom surface of the front compartment,
the water tray further having a bottom surface configured to conduct all water received by the tray downwardly through the tray by gravity feed, and further configured to communicate with the opening in the lower end of the wall;
a cover closing the open top of the front compartment and having a plurality of apertures formed therein through which air can be expelled out of the front compartment and into the atmosphere surrounding the planter;
a water generating device located in said front compartment above the water tray and comprising a Peltier device, a fan, and a plurality of cold sink fins, the water generating device being configured to draw air into the front compartment through the perforated area of the housing so as to contact the cold sink fins and to expel the air out of the front compartment through the plurality of apertures in said cover and into the atmosphere surrounding the planter, such that water condenses on the cold sink fins and flows by gravity into said water tray and such that the water thereafter flows by gravity feed over the bottom surface of the water tray and then through the opening in the lower end of said wall and into said container configured to receive a plant; and
a display unit mounted in said cover and comprising a numeric display and a control button, both configured to cooperate with an electronic control unit to set a time interval during which the water generating device is operational to generate water.

14. The planter of claim 13 wherein the plurality of cold sink fins face outwardly towards said perforated area.

15. The planter of claim 14 wherein the plurality of cold sink fins are vertically disposed and have lower ends which reside within a vertical perimeter of said water tray.

16. The planter of claim 15 further comprising a vertical guide positioned in first and second slots on a back surface of said wall so as to shield the opening in said wall from foreign matter present in said rear compartment.

17. The planter of claim 13 wherein the water generating device comprises first and second heat sinks located on respective opposite sides of the Peltier device and wherein one of said heat sinks functions as said cold sink.

18. The planter of claim 1 further comprising a display unit mounted in said cover and comprising a numeric display and a control button both configured to cooperate with an electronic control unit to set a time interval during which the water generating device is operational to generate water.

19. The planter of claim 8 further comprising a display unit mounted in said cover and comprising a numeric display and a control button both configured to cooperate with an electronic control unit to set a time interval during which the water generating device is operational to generate water.

* * * * *